(12) United States Patent
May

(10) Patent No.: US 10,946,799 B2
(45) Date of Patent: Mar. 16, 2021

(54) VEHICLE VISION SYSTEM WITH OVERLAY CALIBRATION

(71) Applicant: MAGNA ELECTRONICS INC., Auburn Hills, MI (US)

(72) Inventor: Benjamin May, Lübs (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 771 days.

(21) Appl. No.: 15/134,440

(22) Filed: Apr. 21, 2016

(65) Prior Publication Data

US 2016/0311374 A1  Oct. 27, 2016

Related U.S. Application Data

(60) Provisional application No. 62/150,470, filed on Apr. 21, 2015.

(51) Int. Cl.
*B60R 1/00* (2006.01)
*H04N 5/225* (2006.01)
(Continued)

(52) U.S. Cl.
CPC .............. *B60R 1/00* (2013.01); *H04N 5/2257* (2013.01); *H04N 5/2628* (2013.01);
(Continued)

(58) Field of Classification Search
CPC .............. B60R 1/00; B60R 2300/8086; B60R 2300/306; B60R 2300/305; H04N 5/2628;
(Continued)

(56) References Cited

U.S. PATENT DOCUMENTS

| 4,835,532 A * | 5/1989 | Fant ........................ G06T 15/04 340/980 |
| 4,970,653 A | 11/1990 | Kenue |

(Continued)

FOREIGN PATENT DOCUMENTS

| EP | 0361914 | 2/1993 |
| EP | 0697641 | 2/1996 |

(Continued)

OTHER PUBLICATIONS

Achler et al., "Vehicle Wheel Detector using 2D Filter Banks," IEEE Intelligent Vehicles Symposium of Jun. 2004.
(Continued)

*Primary Examiner* — Nasim N Nirjhar
(74) *Attorney, Agent, or Firm* — Honigman LLP

(57) ABSTRACT

A vision system of a vehicle includes a camera disposed at the vehicle and having a field of view exterior of the vehicle. The camera includes an imager and a processor that is operable to process image data captured by the imager. A video display screen is operable to display video images derived from image data captured by the camera. The processor generates a graphic overlay for display with the video images at the video display screen. The processor calibrates the graphic overlay by adapting the view orientation and position of the displayed video images utilizing a spatial transform engine to adapt the view orientation and position to a corrected position and orientation.

20 Claims, 8 Drawing Sheets

(51) Int. Cl.
*H04N 5/262* (2006.01)
*H04N 17/00* (2006.01)
*H04N 5/232* (2006.01)

(52) U.S. Cl.
CPC ... *B60R 2300/305* (2013.01); *B60R 2300/306* (2013.01); *B60R 2300/8086* (2013.01); *H04N 5/23293* (2013.01); *H04N 17/002* (2013.01)

(58) Field of Classification Search
CPC . H04N 5/2257; H04N 17/002; H04N 5/23293
See application file for complete search history.

(56) References Cited

U.S. PATENT DOCUMENTS

| | | | |
|---|---|---|---|
| 5,096,287 A | 3/1992 | Kakinami et al. | |
| 5,177,606 A | 1/1993 | Koshizawa | |
| 5,182,502 A | 1/1993 | Slotkowski et al. | |
| 5,193,029 A | 3/1993 | Schofield | |
| 5,204,778 A | 4/1993 | Bechtel | |
| 5,208,701 A | 5/1993 | Maeda | |
| 5,208,750 A | 5/1993 | Kurami et al. | |
| 5,214,408 A | 5/1993 | Asayama | |
| 5,243,524 A | 9/1993 | Ishida et al. | |
| 5,245,422 A | 9/1993 | Borcherts et al. | |
| 5,276,389 A | 1/1994 | Levers | |
| 5,289,321 A | 2/1994 | Secor | |
| 5,305,012 A | 4/1994 | Faris | |
| 5,307,136 A | 4/1994 | Saneyoshi | |
| 5,351,044 A | 9/1994 | Mathur et al. | |
| 5,355,118 A | 10/1994 | Fukuhara | |
| 5,386,285 A | 1/1995 | Asayama | |
| 5,406,395 A | 4/1995 | Wilson et al. | |
| 5,408,346 A | 4/1995 | Trissel et al. | |
| 5,414,461 A | 5/1995 | Kishi et al. | |
| 5,426,294 A | 6/1995 | Kobayashi et al. | |
| 5,430,431 A | 7/1995 | Nelson | |
| 5,434,407 A | 7/1995 | Bauer et al. | |
| 5,440,428 A | 8/1995 | Hegg et al. | |
| 5,444,478 A | 8/1995 | Lelong et al. | |
| 5,451,822 A | 9/1995 | Bechtel et al. | |
| 5,469,298 A | 11/1995 | Suman et al. | |
| 5,530,420 A | 6/1996 | Tsuchiya et al. | |
| 5,535,144 A | 7/1996 | Kise | |
| 5,535,314 A | 7/1996 | Alves et al. | |
| 5,537,003 A | 7/1996 | Bechtel et al. | |
| 5,539,397 A | 7/1996 | Asanuma et al. | |
| 5,550,677 A | 8/1996 | Schofield et al. | |
| 5,555,555 A | 9/1996 | Sato et al. | |
| 5,568,027 A | 10/1996 | Teder | |
| 5,574,443 A | 11/1996 | Hsieh | |
| 5,648,835 A | 7/1997 | Uzawa | |
| 5,661,303 A | 8/1997 | Teder | |
| 5,670,935 A | 9/1997 | Schofield et al. | |
| 5,699,044 A | 12/1997 | Van Lente et al. | |
| 5,724,316 A | 3/1998 | Brunts | |
| 5,737,226 A | 4/1998 | Olson et al. | |
| 5,757,949 A | 5/1998 | Kinoshita et al. | |
| 5,760,826 A | 6/1998 | Nayer | |
| 5,761,094 A | 6/1998 | Olson et al. | |
| 5,765,116 A | 6/1998 | Wilson-Jones et al. | |
| 5,781,437 A | 7/1998 | Wiemer et al. | |
| 5,790,403 A | 8/1998 | Nakayama | |
| 5,790,973 A | 8/1998 | Blaker et al. | |
| 5,796,094 A | 8/1998 | Schofield et al. | |
| 5,837,994 A | 11/1998 | Stam et al. | |
| 5,845,000 A | 12/1998 | Breed et al. | |
| 5,848,802 A | 12/1998 | Breed et al. | |
| 5,850,176 A | 12/1998 | Kinoshita et al. | |
| 5,850,254 A | 12/1998 | Takano et al. | |
| 5,867,591 A | 2/1999 | Onda | |
| 5,877,707 A | 3/1999 | Kowalick | |
| 5,877,897 A | 3/1999 | Schofield et al. | |
| 5,878,370 A | 3/1999 | Olson | |
| 5,896,085 A | 4/1999 | Mori et al. | |
| 5,920,367 A | 7/1999 | Kajimoto et al. | |
| 5,923,027 A | 7/1999 | Stam et al. | |
| 5,956,181 A | 9/1999 | Lin | |
| 6,049,171 A | 4/2000 | Stam et al. | |
| 6,052,124 A | 4/2000 | Stein et al. | |
| 6,066,933 A | 5/2000 | Ponziana | |
| 6,084,519 A | 7/2000 | Coulling et al. | |
| 6,091,833 A | 7/2000 | Yasui et al. | |
| 6,097,024 A | 8/2000 | Stam et al. | |
| 6,100,811 A | 8/2000 | Hsu et al. | |
| 6,175,300 B1 | 1/2001 | Kendrick | |
| 6,201,642 B1 | 3/2001 | Bos | |
| 6,226,061 B1 | 5/2001 | Tagusa | |
| 6,259,423 B1 | 7/2001 | Tokito et al. | |
| 6,266,082 B1 | 7/2001 | Yonezawa et al. | |
| 6,266,442 B1 | 7/2001 | Laumeyer et al. | |
| 6,285,393 B1 | 9/2001 | Shimoura et al. | |
| 6,285,778 B1 | 9/2001 | Nakajima et al. | |
| 6,297,781 B1 | 10/2001 | Turnbull et al. | |
| 6,310,611 B1 | 10/2001 | Caldwell | |
| 6,313,454 B1 | 11/2001 | Bos et al. | |
| 6,317,057 B1 | 11/2001 | Lee | |
| 6,320,282 B1 | 11/2001 | Caldwell | |
| 6,353,392 B1 | 3/2002 | Schofield et al. | |
| 6,370,329 B1 | 4/2002 | Teuchert | |
| 6,396,397 B1 | 5/2002 | Bos et al. | |
| 6,396,473 B1* | 5/2002 | Callahan | G09G 5/397 345/530 |
| 6,411,204 B1 | 6/2002 | Bloomfield et al. | |
| 6,424,273 B1 | 7/2002 | Gutta et al. | |
| 6,445,287 B1 | 9/2002 | Schofield et al. | |
| 6,477,464 B2 | 11/2002 | McCarthy et al. | |
| 6,498,620 B2 | 12/2002 | Schofield et al. | |
| 6,553,130 B1 | 4/2003 | Lemelson et al. | |
| 6,570,998 B1 | 5/2003 | Ohtsuka et al. | |
| 6,574,033 B1 | 6/2003 | Chui et al. | |
| 6,578,017 B1 | 6/2003 | Ebersole et al. | |
| 6,587,573 B1 | 7/2003 | Stam et al. | |
| 6,589,625 B1 | 7/2003 | Kothari et al. | |
| 6,593,011 B2 | 7/2003 | Liu et al. | |
| 6,593,698 B2 | 7/2003 | Stam et al. | |
| 6,594,583 B2 | 7/2003 | Ogura et al. | |
| 6,611,610 B1 | 8/2003 | Stam et al. | |
| 6,631,316 B2 | 10/2003 | Stam et al. | |
| 6,631,994 B2 | 10/2003 | Suzuki et al. | |
| 6,636,258 B2 | 10/2003 | Strumolo | |
| 6,672,731 B2 | 1/2004 | Schnell et al. | |
| 6,678,056 B2 | 1/2004 | Downs | |
| 6,690,268 B2 | 2/2004 | Schofield et al. | |
| 6,700,605 B1 | 3/2004 | Toyoda et al. | |
| 6,704,621 B1 | 3/2004 | Stein et al. | |
| 6,711,474 B1 | 3/2004 | Treyz et al. | |
| 6,714,331 B2 | 3/2004 | Lewis et al. | |
| 6,735,506 B2 | 5/2004 | Breed et al. | |
| 6,744,353 B2 | 6/2004 | Sjönell | |
| 6,757,109 B2 | 6/2004 | Bos | |
| 6,762,867 B2 | 7/2004 | Lippert et al. | |
| 6,795,221 B1 | 9/2004 | Urey | |
| 6,807,287 B1 | 10/2004 | Hermans | |
| 6,823,241 B2 | 11/2004 | Shirato et al. | |
| 6,824,281 B2 | 11/2004 | Schofield et al. | |
| 6,864,930 B2 | 3/2005 | Matsushita et al. | |
| 6,882,287 B2 | 4/2005 | Schofield | |
| 6,889,161 B2 | 5/2005 | Winner et al. | |
| 6,909,753 B2 | 6/2005 | Meehan et al. | |
| 6,946,978 B2 | 9/2005 | Schofield | |
| 6,968,736 B2 | 11/2005 | Lynam | |
| 6,975,775 B2 | 12/2005 | Rykowski et al. | |
| 7,004,606 B2 | 2/2006 | Schofield | |
| 7,038,577 B2 | 5/2006 | Pawlicki et al. | |
| 7,062,300 B1 | 6/2006 | Kim | |
| 7,065,432 B2 | 6/2006 | Moisel et al. | |
| 7,085,637 B2 | 8/2006 | Breed et al. | |
| 7,092,548 B2 | 8/2006 | Laumeyer et al. | |
| 7,113,867 B1 | 9/2006 | Stein | |
| 7,116,246 B2 | 10/2006 | Winter et al. | |
| 7,123,168 B2 | 10/2006 | Schofield | |
| 7,133,661 B2 | 11/2006 | Hatae et al. | |
| 7,149,613 B2 | 12/2006 | Stam et al. | |

(56) References Cited

U.S. PATENT DOCUMENTS

| | | |
|---|---|---|
| 7,151,996 B2 | 12/2006 | Stein |
| 7,195,381 B2 | 3/2007 | Lynam et al. |
| 7,202,776 B2 | 4/2007 | Breed |
| 7,227,611 B2 | 6/2007 | Hull et al. |
| 7,375,803 B1 | 5/2008 | Bamji |
| 7,380,948 B2 | 6/2008 | Schofield et al. |
| 7,423,821 B2 | 9/2008 | Bechtel et al. |
| 7,526,103 B2 | 4/2009 | Schofield et al. |
| 7,541,743 B2 | 6/2009 | Salmeen et al. |
| 7,565,006 B2 | 7/2009 | Stam et al. |
| 7,566,851 B2 | 7/2009 | Stein et al. |
| 7,605,856 B2 | 10/2009 | Imoto |
| 7,720,580 B2 | 5/2010 | Higgins-Luthman |
| 7,786,898 B2 | 8/2010 | Stein et al. |
| 7,843,451 B2 | 11/2010 | Lafon |
| 7,855,778 B2 | 12/2010 | Yung et al. |
| 7,881,496 B2 | 2/2011 | Camilleri |
| 7,914,187 B2 | 3/2011 | Higgins-Luthman et al. |
| 7,930,160 B1 | 4/2011 | Hosagrahara et al. |
| 7,949,486 B2 | 5/2011 | Denny et al. |
| 8,017,898 B2 | 9/2011 | Lu et al. |
| 8,064,643 B2 | 11/2011 | Stein et al. |
| 8,082,101 B2 | 12/2011 | Stein et al. |
| 8,164,628 B2 | 4/2012 | Stein et al. |
| 8,224,031 B2 | 7/2012 | Saito |
| 8,233,045 B2 | 7/2012 | Luo et al. |
| 8,254,635 B2 | 8/2012 | Stein et al. |
| 8,300,886 B2 | 10/2012 | Hoffmann |
| 8,378,851 B2 | 2/2013 | Stein et al. |
| 8,421,865 B2 | 4/2013 | Euler et al. |
| 8,451,107 B2 | 5/2013 | Lu et al. |
| 8,452,055 B2 | 5/2013 | Stein et al. |
| 8,553,088 B2 | 10/2013 | Stein et al. |
| 2002/0005778 A1 | 1/2002 | Breed |
| 2002/0011611 A1 | 1/2002 | Huang et al. |
| 2002/0113873 A1 | 8/2002 | Williams |
| 2003/0103142 A1 | 6/2003 | Hitomi et al. |
| 2003/0137586 A1 | 7/2003 | Lewellen |
| 2003/0222982 A1 | 12/2003 | Hamdan et al. |
| 2004/0164228 A1 | 8/2004 | Fogg et al. |
| 2005/0219852 A1 | 10/2005 | Stam et al. |
| 2005/0237385 A1 | 10/2005 | Kosaka et al. |
| 2006/0050018 A1 | 3/2006 | Hutzel et al. |
| 2006/0091813 A1 | 5/2006 | Stam et al. |
| 2006/0103727 A1 | 5/2006 | Tseng |
| 2006/0250501 A1 | 11/2006 | Wildmann et al. |
| 2007/0024724 A1 | 2/2007 | Stein et al. |
| 2007/0104476 A1 | 5/2007 | Yasutomi et al. |
| 2007/0242339 A1 | 10/2007 | Bradley |
| 2008/0043099 A1 | 2/2008 | Stein et al. |
| 2008/0091315 A1* | 4/2008 | Krokel ............... G01P 3/68 701/31.4 |
| 2008/0147321 A1 | 6/2008 | Howard et al. |
| 2008/0192132 A1 | 8/2008 | Bechtel et al. |
| 2008/0266396 A1 | 10/2008 | Stein |
| 2009/0113509 A1 | 4/2009 | Tseng et al. |
| 2009/0160987 A1 | 6/2009 | Bechtel et al. |
| 2009/0190015 A1 | 7/2009 | Bechtel et al. |
| 2009/0256938 A1 | 10/2009 | Bechtel et al. |
| 2009/0290032 A1 | 11/2009 | Zhang et al. |
| 2011/0216201 A1 | 9/2011 | McAndrew et al. |
| 2012/0045112 A1 | 2/2012 | Lundblad et al. |
| 2012/0069185 A1 | 3/2012 | Stein |
| 2012/0200707 A1 | 8/2012 | Stein et al. |
| 2012/0314071 A1 | 12/2012 | Rosenbaum et al. |
| 2012/0320209 A1* | 12/2012 | Vico ............... B60R 1/00 348/148 |
| 2013/0141580 A1 | 6/2013 | Stein et al. |
| 2013/0147957 A1 | 6/2013 | Stein |
| 2013/0169812 A1 | 7/2013 | Lu et al. |
| 2013/0286193 A1 | 10/2013 | Pflug |
| 2014/0043473 A1 | 2/2014 | Rathi et al. |
| 2014/0063254 A1 | 3/2014 | Shi et al. |
| 2014/0098229 A1 | 4/2014 | Lu et al. |
| 2014/0247352 A1 | 9/2014 | Rathi et al. |
| 2014/0247354 A1 | 9/2014 | Knudsen |
| 2014/0320658 A1 | 10/2014 | Pliefke |
| 2014/0333729 A1 | 11/2014 | Pflug |
| 2014/0347486 A1 | 11/2014 | Okouneva |
| 2014/0350834 A1 | 11/2014 | Turk |

FOREIGN PATENT DOCUMENTS

| | | |
|---|---|---|
| EP | 1115250 | 7/2001 |
| EP | 2377094 | 10/2011 |
| EP | 2667325 | 11/2013 |
| GB | 2233530 | 9/1991 |
| JP | S5539843 | 3/1980 |
| JP | S58110334 | 6/1983 |
| JP | 6216073 | 4/1987 |
| JP | 6272245 | 5/1987 |
| JP | 01123587 | 5/1989 |
| JP | H1168538 | 7/1989 |
| JP | H236417 | 8/1990 |
| JP | 03099952 | 4/1991 |
| JP | 6227318 | 8/1994 |
| JP | 07105496 | 4/1995 |
| JP | 2630604 | 7/1997 |
| JP | 200274339 | 3/2002 |
| JP | 20041658 | 1/2004 |
| WO | WO2012139636 | 10/2012 |
| WO | WO2012139660 | 10/2012 |
| WO | WO2012143036 | 10/2012 |

OTHER PUBLICATIONS

Behringer et al., "Simultaneous Estimation of Pitch Angle and Lane Width from the Video Image of a Marked Road," pp. 966-973, Sep. 12-16, 1994.

Broggi et al., "Multi-Resolution Vehicle Detection using Artificial Vision," IEEE Intelligent Vehicles Symposium of Jun. 2004.

Sun et al., "On-road vehicle detection using optical sensors: a review", IEEE Conference on Intelligent Transportation Systems, 2004.

Vlacic et al. (Eds), "Intelligent Vehicle Technologies, Theory and Applications", Society of Automotive Engineers Inc., edited by SAE International, 2001.

* cited by examiner

PRIOR ART

RVC2.0

- No video access through micro

- Use of imager internal statistics engine

- Parameter based optical model

- No video access through micro
- Use of companion internal statistics engine
- Grid based optical model (STE)

VEHICLE VISION SYSTEM WITH OVERLAY CALIBRATION

CROSS REFERENCE TO RELATED APPLICATION

The present application claims the filing benefits of U.S. provisional application Ser. No. 62/150,470, filed Apr. 21, 2015, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties. To ensure a good alignment of optical overlays to a real street view captured by an automotive camera, especially a rear camera, the adaption of the overlay's position and orientation to the real view is known. FIG. 2 shows a known art calibration method where the overlays get adapted to scene. By that the horizontal line may be different to ideal mounting situation. The overlays are calculated for different mounting situations.

For dynamic overlays, the steering wheel turning parameters may be determined on the fly, which may cause limitation of the accuracy of the output resolution. Dynamic overlays may be generated in real time or alternatively pre-rendered graphics may be recalled. The pre-rendered data set expands when the overlays need to be adapted to according the calibration parameters. FIG. 3 shows a flow chart of the dynamic overlay calculation. The overlays get adapted according the steering angle.

SUMMARY OF THE INVENTION

The present invention provides a vision system or imaging system or driver assistance system for a vehicle that utilizes one or more cameras (preferably one or more CMOS cameras) to capture image data representative of images exterior of the vehicle. The system includes a video display screen operable to display video images derived from image data captured by the camera, such as a rearward viewing camera at a rear portion of the vehicle. The system provides a calibration of displayed video images to match a graphic overlay generated at the display screen. The control generates the graphic overlay at the display and calibrates the graphic overlay by adapting the view orientation and position of the displayed video images to an ideal position and orientation. The displayed video images are turned and distorted into the ideal position and orientation and, with the view orientation and position adapted to the ideal position and orientation, the overlay matches the displayed images without need of changing the overlays. The graphic overlay may comprise a projected path of travel of the vehicle during a reversing maneuver of the vehicle when the video display screen is displaying video images captured by the rearward viewing camera.

The present invention provides an end of line calibration algorithm which is camera inherent. The task of the algorithm and system is to estimate a camera's three Euler angles (i.e., pitch, yaw, and roll angles) relative to the vehicle using only images or image data captured from the camera on-the-fly for fitting the desired overlays correctly (i.e., matching to the scenery captured by the (rear-) camera), without using specially designed visual patterns or storing the images. By that, a single set of overlays can be used for each vehicle model (instead of several distorted ones).

The processing of the captured image data is thus done in the camera itself. The camera companion chip is operable to do low level processing of image data. The overlay generation is done by the companion chip of the camera so if the camera misaligned, the image data is calibrated or adjusted relative to the overlays so the overlays match the real viewing angle of that camera.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a top down or bird's eye or surround view display and may provide a displayed image that is representative of the subject vehicle, and optionally with the displayed image being customized to at least partially correspond to the actual subject vehicle.

Figure 1:
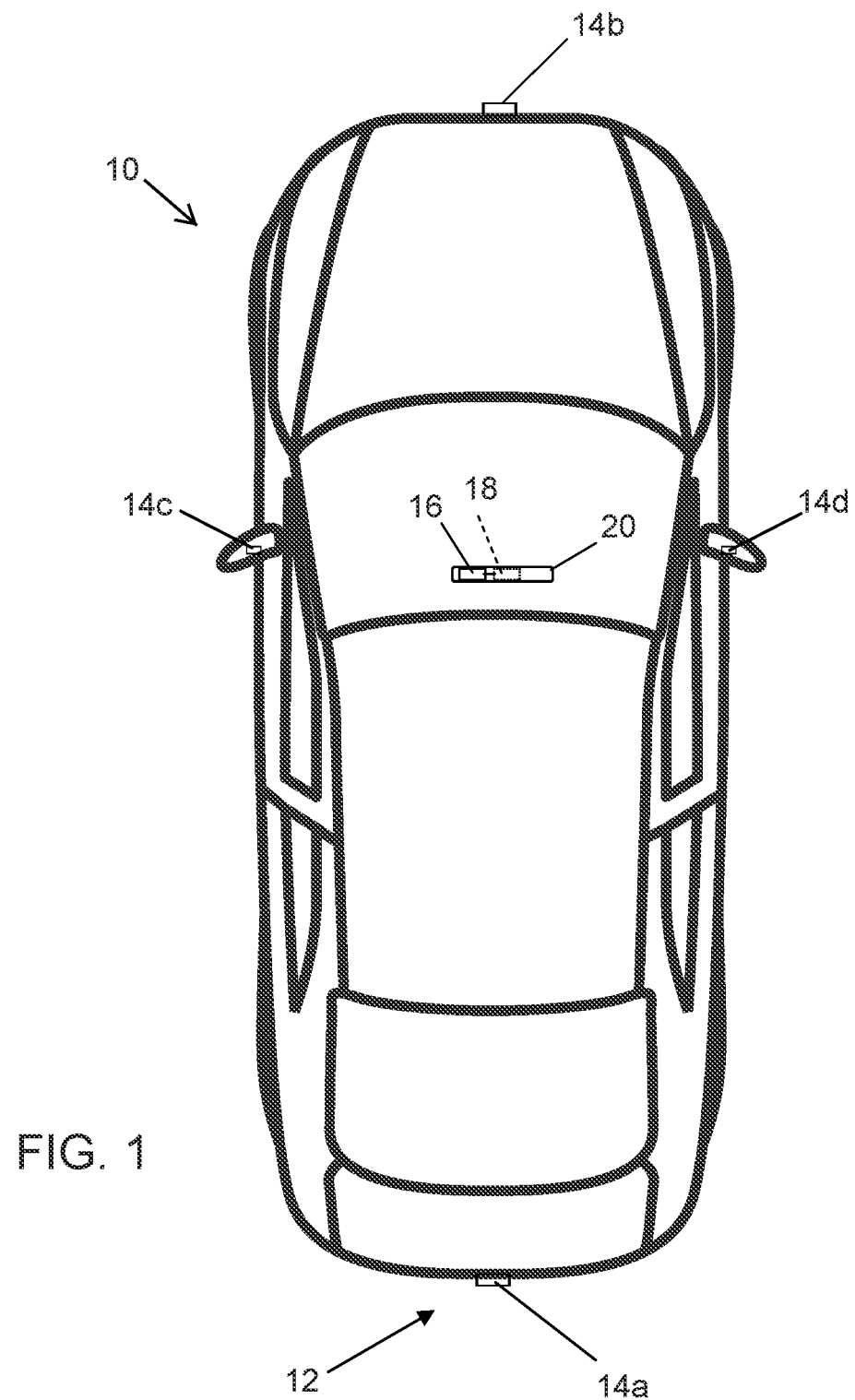
FIG. 1 is a plan view of a vehicle with a vision system that incorporates cameras in accordance with the present invention.
Figure 2:
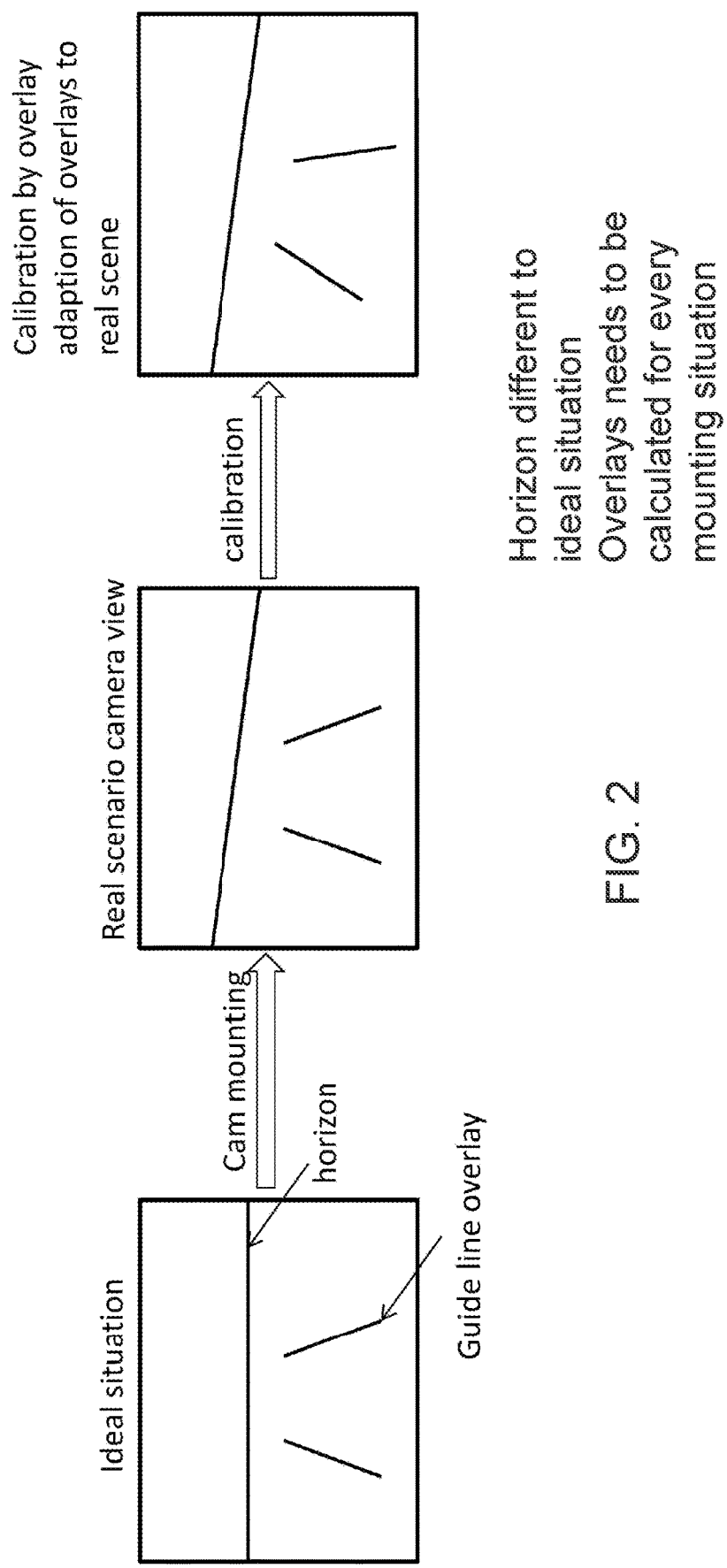
FIGS. 2 and 3 show known processes of calibrating an overlay.
Figure 3:
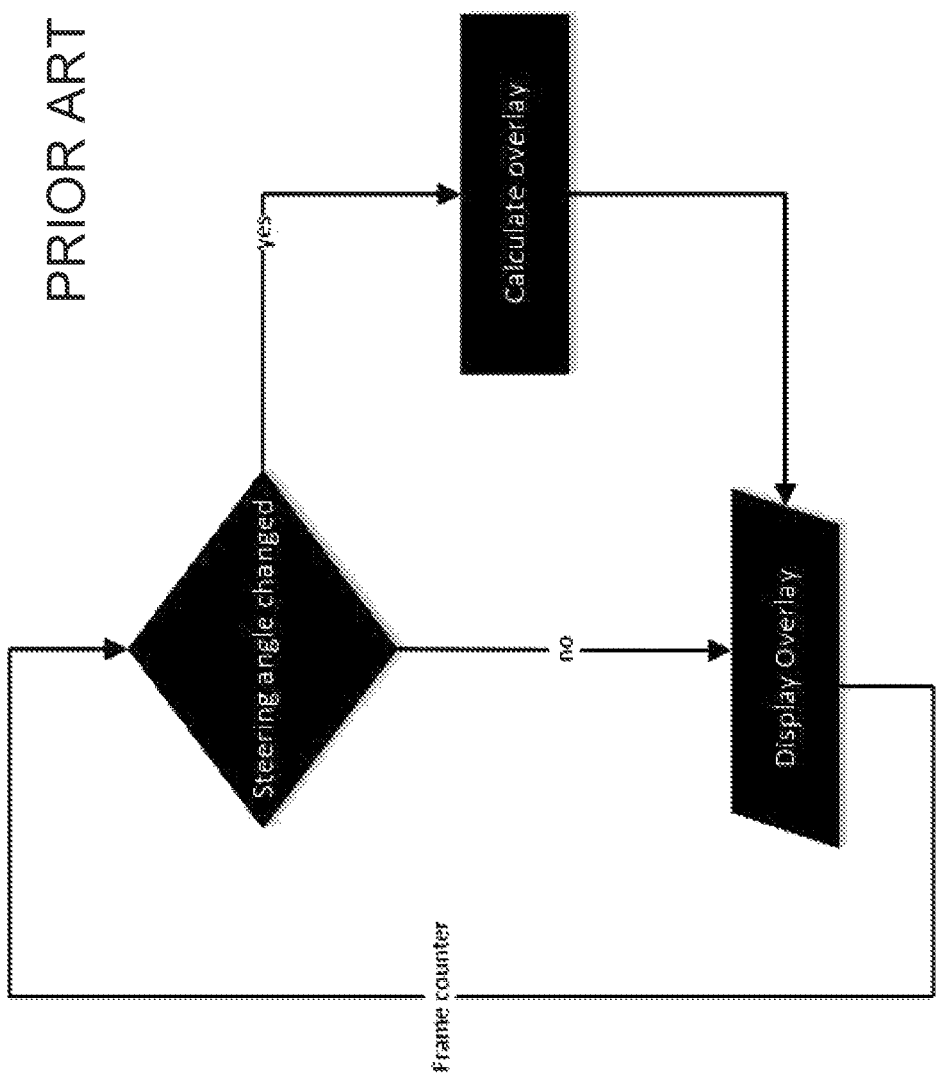

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14*b* at the front (or at the windshield) of the vehicle, and a sidewardly/rearwardly facing camera 14*c*, 14*d* at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) or processor 18 that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Figure 8A:
FIG. 8A is an image captured by a camera of the present invention.
Figure 8B:
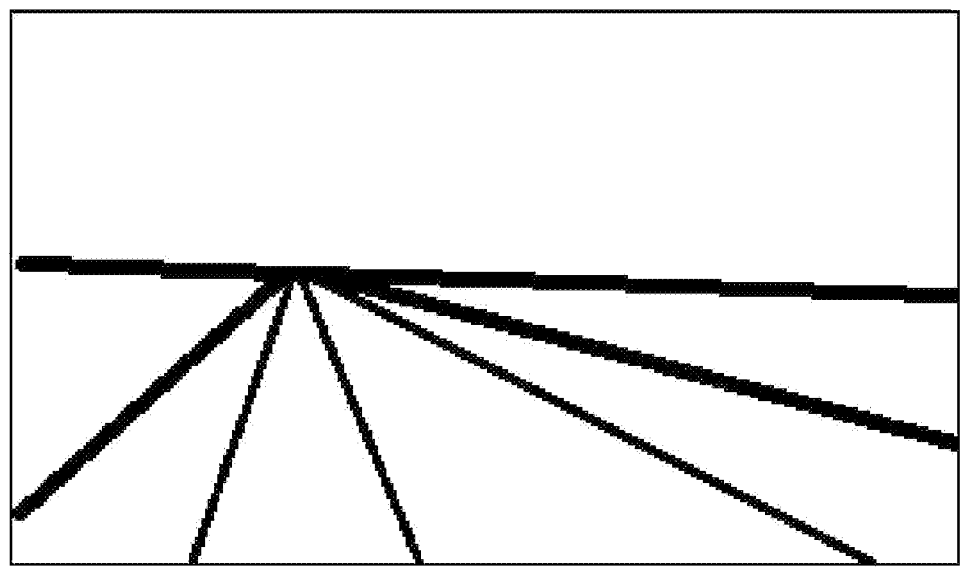
FIG. 8B is a schematic of the image shown in FIG. 8A, with the orientation and height of the horizon showing that the camera is not fully leveled.

The system is operable to display the video images and further generates a graphic overlay at the display screen to provide additional information (such as markings that are indicative of a projected path of travel of the vehicle during a reversing maneuver of the vehicle when the video display screen is displaying video images captured by a rearward viewing camera at the rear of the vehicle) to the driver of the vehicle (such as by utilizing aspects of the vision systems described in U.S. Pat. Nos. 5,670,935 and/or 8,451,107, which are hereby incorporated herein by reference in their entireties). The display may be adapted by turning and distorting the view or displayed image into a desired position for matching to the overlays instead of turning (and eventually distorting) the overlays. For calibration, the three Euler angles (pitch, yaw, roll) of the camera relative to the vehicle using images captured by the camera on the fly, without using specially designed visual patterns or storing of images. The Euler angles are determined when the really captured view is off the ideal or target or nominal orientation. The normal orientation may be determined by statistical means. The most lines in the image run towards the perspective nexus and that contrast line towards the sky is horizontally in the statistical mean value, see FIGS. 8A and 8B.

Alternatively, the normal orientation may be determined by use of structure from motion. When the car is driving straight (steering angle of 0 degrees), most of the motion vectors of static objects are pointing towards the perspective nexus. The nexus determines the horizon's height. The dominant surface that the motion vectors are laying on tells the horizon's orientation or normal.

Figure 4:
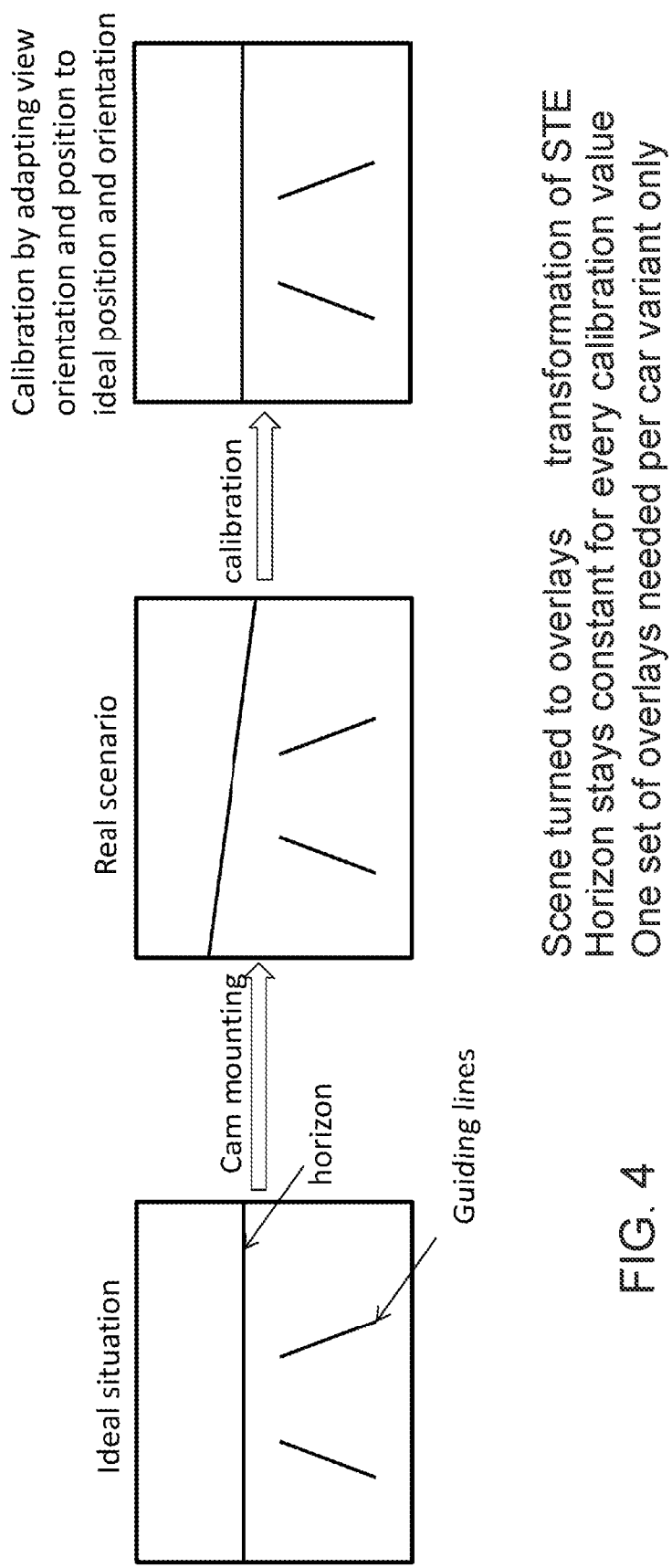
FIG. 4 is block diagram of an overlay calibration method in accordance with the present invention.

FIG. 4 shows the calibration method according to the present invention (adaption of the scene view to the ideal view). The method or system or process calibrates by adapting the view orientation and position to the ideal position and orientation. The scene view gets turned (and optionally distorted) into the ideal view. For example, image data captured by an imager of the camera (where the imager may be established or disposed at an imager chip of the camera) is processed by the processor of the camera (where the processor may be disposed at a companion chip of the camera) to adjust the images for the proper view and orientation. By that the overlays (which are not turned or distorted) will match to the scene view without need of changing the overlays, and the horizontal line may nearly match that in an ideal mounting situation. The output of the camera thus has the adjusted image data with the overlays, which can be communicated to the display device for display of video images with overlays for viewing by the driver of the vehicle.

Figure 5:
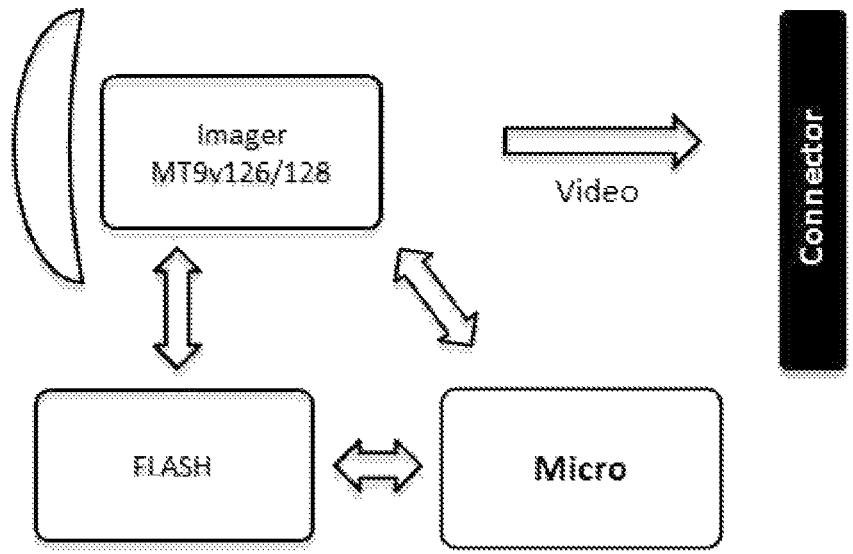
FIG. 5 is a block diagram of a known rear vision camera and image processing for using a parameter based optical model.

FIG. 5 shows a conventional rear vision camera image processing block diagram for using a parameter based optical model. In conventional systems, the overlays are generated by the imager.

Figure 6:
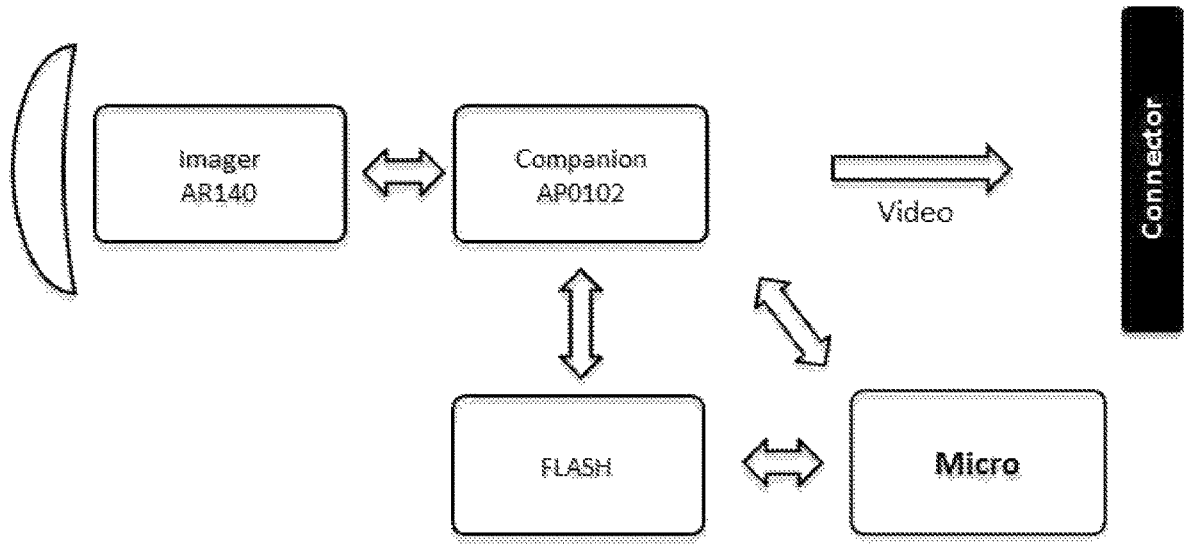
FIG. 6 is a block diagram of a rear vision camera and image processing in accordance with the present invention.

FIG. 6 shows a rear vision camera image processing block diagram in accordance with the invention for using a grid based optical model (spatial transform engine or STE) having a companion chip. The companion chip enables the access to the video stream for turning the image according the optical grid model. The present invention provides a smart rear view camera. There is no additional image processing device other than the camera itself, and by that all image processing, such as overlay generation, is done at the camera, such as by the companion chip of the camera.

The calibration method of the present invention eases the production process. For each vehicle camera part number, just one standard STE file needs to be generated (offline, pre-production). The optical calibration can be done once on the customer line. Upon optical calibration, the camera adapts the STE map (matching the real view to the ideal view, which equates to match to the overlays).

Figure 7:
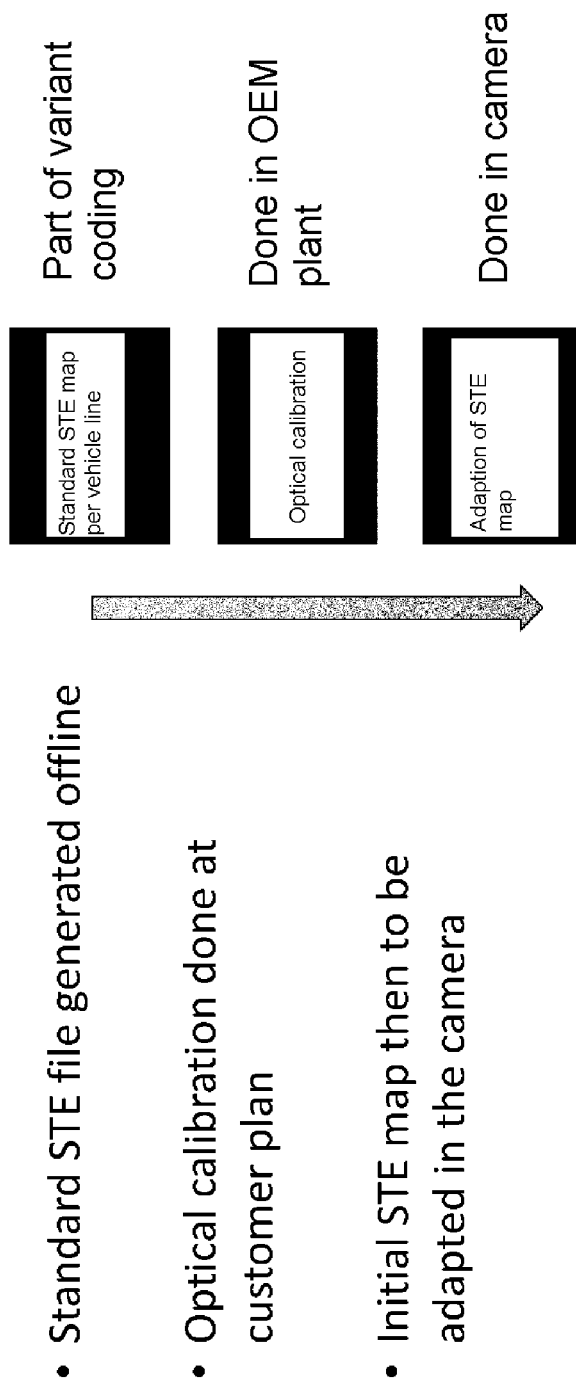
FIG. 7 is a manufacturing process chart of a calibration method in accordance with the present invention.

FIG. 7 shows a manufacturing process chart according the inventive calibration method. A standard STE file is generated offline. The optical calibration is done at the customer or OEM vehicle assembly plant or facility. The initial STE map is then adapted by the camera during run time in the field.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. Publication No. US-2012-0062743, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281, which are all hereby incorporated herein by reference in their entireties. The camera or cameras may comprise any suitable cameras or imaging sensors or camera modules, and may utilize aspects of the cameras or sensors described in U.S. Publication No. US-2009-0244361 and/or U.S. Pat. Nos. 8,542,451; 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; 7,720,580 and/or 7,965,336, and/or International Publication Nos. WO/2009/036176 and/or WO/2009/046268, which are all hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or U.S. Publication Nos. US-2012-0162427; US-2006-0050018 and/or US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vision system of a vehicle, said vision system comprising:

a camera disposed at a vehicle and having a field of view exterior of the vehicle;

wherein said camera comprises an imager having a pixelated imaging array having a plurality of photosensing elements;

wherein said camera comprises a processor operable to process image data captured by said imager;

a video display screen operable to display video images derived from image data captured by said imager;

wherein said processor generates a graphic overlay for display with the video images at said video display screen; and wherein, responsive to processing by said processor of image data captured by said imager, said processor calibrates the camera relative to the vehicle by adapting the image data utilizing a spatial transform engine to adapt the image data orientation and position relative to the generated graphic overlay to a corrected orientation and position relative to the generated graphic overlay.

2. The vision system of claim 1, wherein the processor calibrates the camera by turning and distorting the image data so that a horizon line is generally horizontal.

3. The vision system of claim 2, wherein the displayed video images are turned and distorted into the corrected position and orientation with the horizon line displayed as generally horizontal.

4. The vision system of claim 3, wherein, with the image data orientation and position relative to the generated graphic overlay adapted to the corrected orientation and position relative to the generated graphic overlay, the graphic overlay matches the displayed images without need of changing the graphic overlay.

5. The vision system of claim 1, wherein said camera comprises a rearward viewing camera disposed at a rear portion of the vehicle.

6. The vision system of claim 5, wherein the graphic overlay comprises a projected path of travel of the vehicle during a reversing maneuver of the vehicle when said video display screen is displaying video images captured by said rearward viewing camera.

7. The vision system of claim 1, wherein said processor calibrates the camera via a companion chip under use of frames of captured image data it receives from said imager.

8. The vision system of claim 1, wherein said processor adapts the image data orientation and position relative to the generated graphic overlay according to a grid based optical model.

9. The vision system of claim 1, wherein the vehicle receives a standard spatial transform engine map at an end of line of an assembly line.

10. The vision system of claim 9, wherein the system adapts the spatial transform engine map over a runtime at or after the end of line of the assembly line.

11. A vision system of a vehicle, said vision system comprising:
  a rearward viewing camera disposed at a rear portion of a vehicle and having a field of view exterior and rearward of the vehicle;
  wherein said rearward viewing camera comprises an imager having a pixelated imaging array having a plurality of photosensing elements;
  wherein said rearward viewing camera comprises a companion chip having a processor operable to process image data captured by said imager;
  wherein said processor runs calibration with use of frames of captured image data it receives from said imager;
  a video display screen operable to display video images derived from image data captured by said imager;
  wherein said processor generates a graphic overlay for display with the video images at said video display screen;
  wherein the graphic overlay comprises a projected path of travel of the vehicle during a reversing maneuver of the vehicle when said video display screen is displaying video images captured by said rearward viewing camera; and
  wherein, responsive to processing by said processor of image data captured by said imager, said processor calibrates the camera relative to the vehicle by adapting the image data utilizing a spatial transform engine to adapt the image data orientation and position relative to the generated graphic overlay to a corrected orientation and position relative to the generated graphic overlay.

12. The vision system of claim 11, wherein the processor calibrates the camera by turning and distorting image data so that a horizon line is generally horizontal.

13. The vision system of claim 12, wherein the displayed video images are turned and distorted into the corrected position and orientation with the horizon line displayed as generally horizontal.

14. The vision system of claim 13, wherein, with the image data orientation and position relative to the generated graphic overlay adapted to the corrected orientation and position relative to the generated graphic overlay, the graphic overlay matches the displayed images without need of changing the graphic overlay.

15. The vision system of claim 11, wherein said processor adapts the image data orientation and position relative to the generated graphic overlay according to a grid based optical model.

16. The vision system of claim 11, wherein the vehicle receives a standard spatial transform engine map at an end of line of an assembly line.

17. The vision system of claim 16, wherein the system adapts the spatial transform engine map over a runtime at or after the end of line of the assembly line.

18. A vision system of a vehicle, said vision system comprising:
  a rearward viewing camera disposed at a rear portion of a vehicle and having a field of view exterior and rearward of the vehicle;
  wherein said rearward viewing camera comprises an imager having a pixelated imaging array having a plurality of photosensing elements;
  wherein said rearward viewing camera comprises a processor operable to process image data captured by said imager;
  a video display screen operable to display video images derived from image data captured by said imager;
  wherein said processor generates a graphic overlay for display with the video images at said video display screen;
  wherein the graphic overlay comprises a projected path of travel of the vehicle during a reversing maneuver of the vehicle when said video display screen is displaying video images captured by said rearward viewing camera;
  wherein, responsive to processing by said processor of image data captured by said imager, said processor calibrates the camera relative to the vehicle by adapting the image data utilizing a spatial transform engine to adapt the image data orientation and position relative to the generated graphic overlay to a corrected orientation and position relative to the generated graphic overlay; and
  wherein, with the image data orientation and position relative to the generated graphic overlay adapted to the corrected orientation and position relative to the generated graphic overlay, the graphic overlay matches the displayed images without need of changing the graphic overlay.

19. The vision system of claim 18, wherein the processor calibrates the camera by turning and distorting the image data so that a horizon line is generally horizontal, and wherein the displayed video images are turned and distorted into the corrected position and orientation with the horizon line displayed as generally horizontal.

20. The vision system of claim 18, wherein the vehicle receives a standard spatial transform engine map at an end of line of an assembly line, and wherein the system adapts the spatial transform engine map over a runtime at or after the end of line of the assembly line.

* * * * *